United States Patent [19]

Kawajiri et al.

[11] Patent Number: 4,791,307

[45] Date of Patent: Dec. 13, 1988

[54] METHOD FOR READING OUT CHARGES IN SOLID-STATE IMAGE PICKUP UNIT

[75] Inventors: Kazuhiro Kawajiri; Masatoshi Tabei, both of Kanagawa, Japan

[73] Assignee: Fuji Photo Film Co., Ltd., Kanagawa, Japan

[21] Appl. No.: 108,340

[22] Filed: Oct. 14, 1987

[30] Foreign Application Priority Data

Oct. 14, 1986 [JP] Japan .................. 61-242046

[51] Int. Cl.⁴ .................. H01J 40/14; H04N 3/14
[52] U.S. Cl. .................. 250/578; 358/213.22
[58] Field of Search .................. 250/578; 358/213.22, 358/213.26, 213.29

[56] References Cited

U.S. PATENT DOCUMENTS 4,153,915  5/1979  McKechnie .................. 358/213.26
4,392,158  7/1983  Aoki et al. .................. 358/213.22
4,686,573  8/1987  Murayama et al. .................. 358/213.22

Primary Examiner—David C. Nelms
Assistant Examiner—Steven J. McGowan
Attorney, Agent, or Firm—Sughrue, Mion, Zinn, Macpeak and Seas

[57] ABSTRACT

A method for reading out signal charges in a solid-state image pickup unit providing either an improved resolution for a constant vertical integration density or a reduced vertical integration density while maintaining the same resolution. The photoelectric conversion elements of the unit are arranged in a matrix of rows and columns with m rows of photoelectric conversion elements being assigned to each scanning line. Signal charges generated in the photoelectric conversion elements during exposure are transferred to a vertical transfer section in the order of the m-th row to the first row in each scanning line, and then the charges are transferred to a horizontal charge transfer section using a four-phase driving method.

6 Claims, 2 Drawing Sheets

METHOD FOR READING OUT CHARGES IN SOLID-STATE IMAGE PICKUP UNIT

BACKGROUND OF THE INVENTION

The present invention pertains to a method for reading signal charges from a solid-state image pickup unit with either an improved resolution or reduced vertical integration density.

There has been known a solid-state image pickup unit including a photosensing section (matrix of photoelectric conversion elements), a charge transfer section, a charge transfer control section, and a mosaic microfilter arranged over the photosensing section. In the conventional pickup unit, each photoelectric conversion element is provided with a filter element corresponding to one of the three primary colors, red, green and blue.

Various patterns for the filter elements of the mosaic microfilter have been proposed. In one of these, known as the "Bayer" arrangement, red and green color filter elements are alternately arranged on the odd rows of photosensing elements in the photosensing section, and green and blue filter elements on the even rows. In this arrangement, red, green and blue color signals are thus independently read out by combining outputs from each respective two adjacent rows to thereby separately obtain the red, green and blue colors signals. Using this arrangement, a color image having a good resolution can be obtained, that is, a resolution substantially the same as that of a monochrome image sensing unit.

In the case where interleaved scanning is employed with such a color image pickup unit, the signals from respective adjacent rows numbers $2n+1$ and $2n+2$ are paired and employed for the A field of the output image, while the signals from respective adjacent rows numbers $2n+2$ and $2n+3$ are paired and employed for the B field (where n is zero or a positive integer). However, the use of interleaved scanning results in a degradation of the resolution in the vertical direction of the photosensing section. Improved resolution can theoretically be achieved by increasing the integration density of the device, but, in practice, increasing the integration density is difficult and accompanied by other problems.

SUMMARY OF THE INVENTION

Accordingly, it is thus an object of the present invention to provide a color image pickup unit of the above-described type which does not suffer such a degradation in resolution for interleaved scanning and which has a good vertical resolution.

In accordance with the above and other objects, the invention provides a method for reading out signal charges from a solid-state image pickup unit having a plurality of photoelectric conversion elements arranged in a matrix of rows and columns in which m rows are assigned to each scanning line with m being an integer greater than one, a vertical charge transfer section receiving signal charges from the photoelectric conversion elements, and a transfer control section for controlling the transfer of the signal charges, which, in accordance with the invention, employs steps of exposing the pickup unit to light; transferring a resulting signal charge in each photoelecric conversion element of the m-th row in each scanning line to the vertical charge transfer section; transferring the signal charges transferred in the previous step within the vertical charge transfer section vertically through a distance corresponding to one cell of the vertical charge transfer section; transferring a signal charge in each photoelectric conversion element of the (m-1)-th row to the vertical charge transfer section; transferring the signal charges transferred in the previous step within the vertical charge transfer section vertically through the distance corresponding to one cell of the vertical charge transfer section; repeating the above transferring steps for the other rows in the order of the m-th row to second row; transferring a signal charge in each photoelectric conversion element of a first row in each scanning line to the vertical charge tranfer section; and transferring the signal charges then stored in the vertical charge transfer section to a horizontal charge transfer section.

That is, by providing two cells per photoelectric conversion element, after the signal charges generated in the photoelectric conversion elements in the m rows of photoelectric conversion elements assigned to each scanning line have been completely transferred to the vertical transfer section and have filled every other cell of the vertical transfer section, all signal charges stored in the vertical transfer section can be transferred to the horizontal transfer section using a four-phase driving method. This provides an improved resolution without an attendant increase in the vertical integration density. Alternatively, a reduced vertical integration density can be achieved without loss of resolution.

DESCRIPTION OF THE PREFERRED EMBODIMENTS

Preferred embodiments of the invention will now be described with reference to the accompanying drawings.

In the following description, it is assumed that $m=2$, that is, two rows of photoelectric conversion elements are provided for each scanning line. However, the invention is not limited to this particular number, and m may be 3 or more.

Figure 1:
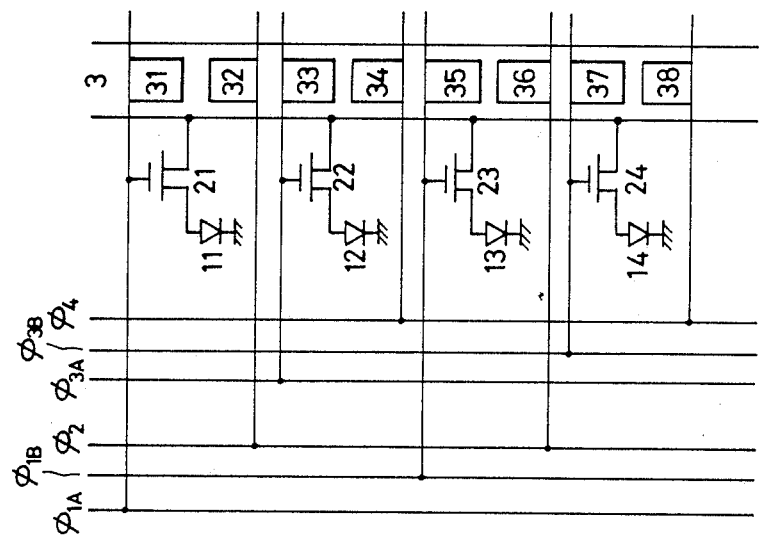
FIG. 1 is an explanatory diagram used for explaining the operation of a solid-state image pickup unit in accordance with a preferred embodiment of the invention.

FIG. 1 shows schematically a portion of an optical pickup unit constructed according to the present invention. In this embodiment, photoelectric conversion elements 11–14 are connected through vertical switches 21–24 to a vertical charge transfer section 3 through a CCD (charge-coupled device). The vertical charge transfer section is provided with charge transfer electrodes 31–38 for transferring signal charges within the section, that is, in the vertical direction in the drawing. The gate electrodes of the vertical switches 21–24 and the charge transfer electrodes 31–38 are connected to transfer control lines $\phi_{1A}$, $\phi_{1B}$, $\phi_2$, $\phi_{3A}$ and $\phi_4$ in the manner depicted in FIG. 1.

The vertical switches are designated symbolically by transistors in FIG. 1. However, a CCD can be used as well to perform the function of the vertical charge transfer section. In such a case, the CCD performs signal charge transfer from the photoelectrtic conversion elements 11–14 to the vertical transfer section 3, and charge transfer electrodes are provided in place of the vertical switches 21–24 in FIG. 1. The transfer control lines $\phi_{1A}$–$\phi_4$ are supplied with shift pulses of appropriate different phases.

Figure 2:
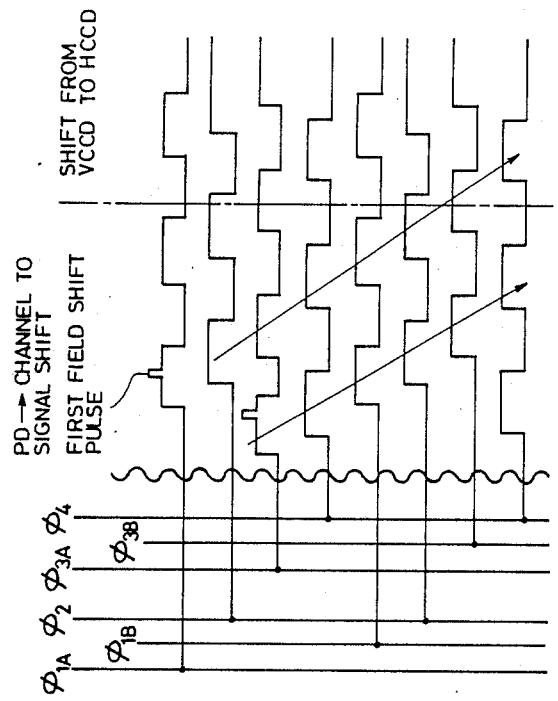
FIG. 2 is a timing chart showing the operation of the solid-state image pickup unit of FIG. 1.

The operation of the above-described embodiment will now be discussed with reference to FIG. 2.

In the first step, a first pulse is applied to the transfer control line $\phi_{3A}$, rendering the vertical switch 22 conductive and thereby transferring a signal charge produced in the photoelectric conversion element 12 in the immediately previous exposure through the vertical switch 22 to an electrode 33 of the vertical transfer section. In the second step, a second pulse is supplied to the transfer control line $\phi_4$ to transfer the signal charge then held beneath the electrode 33 to the electrode 34. In the third step, third and fourth pulses are applied simultaneously to the transfer control lines $\phi_{1A}$ and $\phi_{1B}$, respectively. The third pulse applied to the transfer control line $\phi_{1A}$, similar to the first pulse applied to the transfer control line $\phi_{3A}$, has a higher level that the other pulses, therefore making the switch 21 conductive. The fourth pulse applied to the transfer control line $\phi_{1B}$, as does the remaining other pulses, has a lower level but sufficient to transfer a signal charge in the vertical transfer section. Accordingly, the signal charge from the photoelectric conversion element 11 is transferred through the switch 21 to the electrode 31 in the vertical charge transfer section, while the signal charge from the photoelectric conversion element 13 is not moved. During this time, the signal charge from the electrode 34 is transferred to the electrode 35.

Through the above steps, the signal charges generated in the various photoelectric conversion elements 11 and 12 are transferred to the vertical charge transfer section 3 and held beneath the electrodes 31 and 35, respectively.

The portion of the solid-state image pickup depicted in FIG. 1 corresponds to a part of the scanning lines for both the A and B fields when interlaced scanning is employed. Accordingly, signal charges from the photoelectric conversion elements 13 and 14 are not read out during the period of time the A field is being scanned. Of course, during the scanning of the A field the charges in photoelectric conversion elements associated with the A field are read out in the same manner as that described above. That is, the signal charges from other photoelectric conversion elements 11, 12, (and 15, 16, etc., assuming the same sequence as that shown in the drawing) read out and transferred to the electrodes 31, 35, (and 39, 43, etc., again assuming the same sequence as that shown in the drawing) in the same manner already discussed.

With respect to the vertical transfer section 3, since four electrodes are assigned to each signal charge stored in the vertical transfer section (for example, the electrodes 31–34 assigned to the signal charge stored beneath the electrode 31), the signal charges in the vertical transfer electrodes can be transferred with the four-phase driving method well known in the art. The signal charges thus transferred are applied to a horizontal charge transfer section (not shown), again by a well-known method, and then subjected to subsequent processing in the usual manner. Because these techniques are all quite well known in the art, a further detailed explanation will be omitted.

Figure 3:
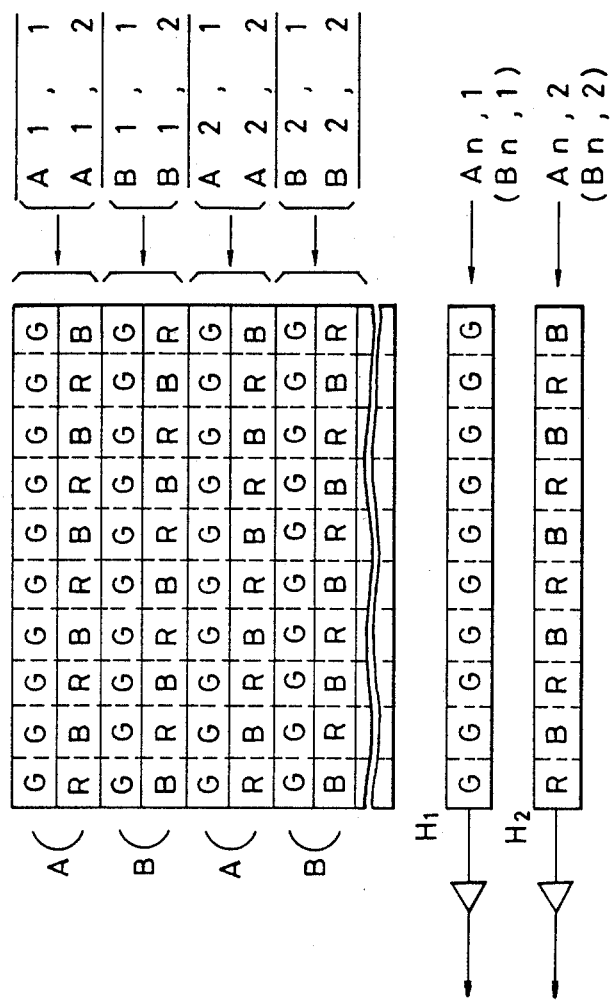
FIG. 3 is a diagram showing the color filter element pattern of a microfilter employed in the invention.

FIG. 3 shows the arrangement of the microfilter employed with the invention in the case where the invention is applied to a color image pickup unit.

Each scanning line is associated with two rows of photoelectric conversion elements where the photoelectric conversion elements in the first row are provided with green filters, while the photoelectric conversion elements in the second row are provided alternatingly with red and blue filters. Accordingly, signals for all three primary colors can be generated for each scanning line. In the illustrated case, the horizontal transfer section 2 includes two horizontal CCDs, wherein the first CCD is used exclusively for the red and blue signals. The red, green and blue signals are of course read out independently of one another and subjected to further optional processing.

Although a color microfilter is used in the embodiment discussed above, the invention can be used to advantage also in a monochromatic pickup unit. In such a case, the same advantageous effect on impoved resolution without increasing the vertical integration density is achieved. Equivalently, if no improvement in resolution is needed for a particular application, the vertical integration density may be reduced. That is, using the method of the invention whereby charge transfer is performed using a four-phase driving method with a vertical charge transfer section having only two transfer electrodes per pixel, either the resolution may be improved or the vertical integration density reduced, depending upon the application at hand.

This completes the description of the preferred embodiments of the present invention. Although preferred embodiments have been described, it is believed that numerous modifications and alterations thereto may be made without departing from the spirit and scope of the invention.

What is claimed is:

1. A method for reading out signal charges from a solid-state image pickup unit having a plurality of photoelectric conversion elements arranged in a matrix of rows and columns in which m rows are assigned to each scanning line with m being an integer greater than one, a vertical charge transfer section receiving signal charges from said photoelectric conversion elements, and a transfer control section for controlling the transfer of said signal charges, said method comprising the steps of:
   (1) exposing said pickup unit to light;
   (2) transferring a resulting signal charge in each photoelectric conversion element of the m-th row in each scanning line to said vertical charge transfer section;
   (3) transferring the signal charges transferred in step (2) within said vertical charge transfer section vertically through a distance corresponding to one cell of said vertical charge transfer section;
   (4) transferring a signal charge in each photoelectric conversion element of the (m-1)-th row to said vertical charge transfer section;
   (5) transferring said signal charges transferred in step (4) within said vertical charge transfer section vertically through said distance corresponding to one cell of said vertical charge transfer section;
   (6) repeating stps (2) to (5) in th order of said m-th row to second row;
   (7) transferring a signal charge in each photoelectric conversion element of a first row in each scanning line to said vertical charge transfer section; and
   (8) transferring the signal charges then stored in said vertical charge transfer section to a horizontal charge transfer section.

2. The method of claim 1, wherein a color microfilter is provided for said photoelectric conversion elements so as to provide output signals in three primary colors.

3. The method of claim 2, wherein two rows are assigned to each scanning line.

4. The method of claim 3, wherein the upper row of said two rows is provided with green color filters and the lower row is provided alternately with red and blue color filters.

5. The method of claim 4, wherein said horizontal charge transfer section comprises two horizontal CCDs, one thereof used exclusively for green signals and the other used exclusively for red and blue signals.

6. The method of claim 1, wherein said vertical transfer section comprises a charge-coupled devices.

* * * * *